(12) United States Patent
Lee et al.

(10) Patent No.: US 9,971,399 B2
(45) Date of Patent: May 15, 2018

(54) WATCH TYPE CONTROL DEVICE

(71) Applicant: LG ELECTRONICS INC., Seoul (KR)

(72) Inventors: Byunghwa Lee, Seoul (KR); Choonghwan Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 335 days.

(21) Appl. No.: 14/829,958

(22) Filed: Aug. 19, 2015

(65) Prior Publication Data

US 2016/0124500 A1 May 5, 2016

(30) Foreign Application Priority Data

Oct. 29, 2014 (KR) ........................ 10-2014-0148501

(51) Int. Cl.
| | |
|---|---|
| G06F 3/01 | (2006.01) |
| G06F 1/16 | (2006.01) |
| G06F 3/03 | (2006.01) |
| G06F 3/16 | (2006.01) |
| G08C 17/00 | (2006.01) |

(52) U.S. Cl.
CPC .............. *G06F 3/011* (2013.01); *G06F 1/163* (2013.01); *G06F 1/1635* (2013.01); *G06F 1/1639* (2013.01); *G06F 1/1654* (2013.01); *G06F 1/1684* (2013.01); *G06F 1/1688* (2013.01); *G06F 1/1694* (2013.01); *G06F 3/017* (2013.01); *G06F 3/0304* (2013.01); *G06F 3/167* (2013.01); *G08C 17/00* (2013.01); *G06F 3/014* (2013.01); *G08C 2201/32* (2013.01)

(58) Field of Classification Search
CPC ......... G08C 17/00; G06F 3/011; G06F 3/017; G06F 1/1639; G06F 3/0304
See application file for complete search history.

(56) References Cited

U.S. PATENT DOCUMENTS

| | | | |
|---|---|---|---|
| 2012/0249409 A1 | 10/2012 | Toney et al. | |
| 2012/0297428 A1* | 11/2012 | Pan .................. | G06F 3/1454 725/81 |
| 2014/0055352 A1* | 2/2014 | Davis ................ | G06F 3/017 345/156 |
| 2014/0098018 A1 | 4/2014 | Kim et al. | |
| 2014/0347295 A1 | 11/2014 | Kim et al. | |
| 2015/0054730 A1* | 2/2015 | Kodama ............ | G09G 3/001 345/156 |
| 2015/0062010 A1* | 3/2015 | Lin ................... | G06F 3/017 345/157 |
| 2015/0341606 A1* | 11/2015 | Xu .................... | H04N 9/3173 353/119 |

FOREIGN PATENT DOCUMENTS

| | | |
|---|---|---|
| JP | 2005128523 A | 5/2005 |
| JP | 2009273751 A | 11/2009 |

* cited by examiner

*Primary Examiner* — Abbas Abdulselam
(74) *Attorney, Agent, or Firm* — Dentons US LLP

(57) ABSTRACT

A watch type control device comprises: a band configured to surround at least a portion of a user's wrist; an IR module disposed on a side of the band facing the user's hand when the watch type control device is worn on the user's wrist, the user's hand and wrist being on the same side of the user's body; and a beam projector disposed on the band and configured to outwardly project a screen, wherein the IR module is configured to recognize a user's hand gesture and to initiate the execution of a program causing the beam projector to output on the screen a display corresponding to the program.

17 Claims, 25 Drawing Sheets

WATCH TYPE CONTROL DEVICE

CROSS-REFERENCE TO RELATED APPLICATION

Pursuant to 35 U.S.C. § 119(a), this application claims the benefit of earlier filing date and right of priority to Korean Application No. 10-2014-0148501, filed on Oct. 29, 2014, the contents of which is incorporated by reference herein in its entirety.

BACKGROUND OF THE INVENTION

1. Field of the Invention

The present disclosure relates to a watch type control device that can be worn on a user's wrist.

2. Background of the Invention

Devices that control an executed program through a display has increased. For example, in these devices, programs or games executed through a TV are controlled by shaking or moving the devices in a particular direction.

As functions of control devices become more diversified, control devices are implemented in the form of a multimedia player including composite functions such as capturing images or video, reproducing music or video files, playing games, receiving broadcast signals, and the like.

In order to support and increase functions of control devices, improvement of structural parts and/or software parts of control devices may be taken into consideration.

Fueled by such improvements, control devices have evolved into designs having various forms, and accordingly, a wearable device that can be worn on a part of a user's body has come to prominence and the necessity for a user interface based on the forms and characteristics of wearable devices has emerged.

Also, when controlled separately from a display, two or more devices are required, leading to a problem in which several devices need to be provided. Also, in case of using a fixed display, a program is to be performed in a location where the fixed display is visible, degrading portability.

SUMMARY OF THE INVENTION

Therefore, an aspect of the detailed description is to provide a watch type control device, which can be worn on a user's wrist, capable of providing a display and controlling an executed program through the display.

To achieve these and other advantages and in accordance with the purpose of this specification, as embodied and broadly described herein, a watch type control device may include: a band unit configured to surround at least a portion of a wrist and form a frame; an IR module unit disposed on the side of the band unit and configured to face a user's hand when worn on the wrist; and a beam projector unit disposed on an outer circumferential surface of the band unit and configured to output a screen outwardly, wherein the IR module unit recognizes a motion of the user's hand such that a program that can be displayed through the beam projector unit is controlled by a gestures of the user's hand.

According to an example related to the present disclosure, the IR module unit may be provided to be movable along the band unit such that the user's hand may be tracked.

The band unit may include: an outer band configured to surround the wrist; and an inner band coupled along the outer band within the outer band and brought into contact with the wrist, wherein the IR module unit is inserted between the outer band and the inner band and move along a side surface of the band unit.

The outer band may include a first rail unit formed to be recessed inwardly on an inner circumferential surface, the inner band may include a second rail unit formed to be recessed inwardly on an outer circumferential surface facing the outer band, and the IR module unit may include a guide plate inserted between the first and second rail units to move the band unit.

The outer band and the inner band may include a first PCB and a second PCB, respectively, the IR module unit may include a contact plate extending between the outer band and the inner band and disposed at a predetermined angle with the guide plate, and the contact plate may include a first terminal formed to be brought into contact with the first PCB and a second terminal formed to be brought into contact with the second PCB.

Each of the outer band and the inner band may include first and second contact paths formed to be adjacent to the first and second rail units such that the first terminal and the second terminal may be brought into contact with the first PCB and the second PCB, respectively, when the IR module unit moves along the band unit.

The first terminal and the second terminal may be disposed on the mutually opposite sides of the contact plate.

A wobble preventing protrusion may be provided on at least one end portion of the guide plate and bent to extend outwardly from the guide plate such that the IR module unit moving on the rail unit is prevented from wobbling.

According to another example related to the present invention, the IR module unit may include: an IR laser configured to recognize a user's hand and formed to recognize a distance to the user's hand; and an IR camera configured to capture an image of the user's hand and recognize a gesture.

The IR camera and the IR laser may be provided to be rotatable with respect to the band unit in order to continuously recognize the user's hand according to a change in a position of the user's hand.

The beam projector unit may be provided as a rotatable ball disposed on an outer circumferential surface of the outer band and outputting screen information to a target location.

The beam projector unit may be provided as a module detachably attached to an outer circumferential surface of the outer band, and the beam projector may be provided to be detachably attached to user wearable glasses and configured to project a screen on the glasses.

The inner band may include a battery disposed along an inner circumferential surface; a battery terminal formed in an end portion of the battery; and a connection pin formed on an outer circumferential surface and coupled to the outer band.

The outer band may include an antenna for communicating with the outside.

The antenna may be at least one among a Wi-Fi antenna, a Bluetooth antenna, and a mobile communication antenna.

The outer band may further include a speaker formed on an outer circumferential surface of the outer band and generate a sound together with an image projected by the beam projector.

The outer band may further include a microphone unit formed on an outer circumferential surface of the outer band and configured to control a program that can be displayed through the beam projector or record a sound when recording is performed through the IR module unit or an image capturing camera.

The outer band may include a key button formed to be pressed or rotated on an outer circumferential surface of the outer band and configured to turn on or off power, and select various control modes.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
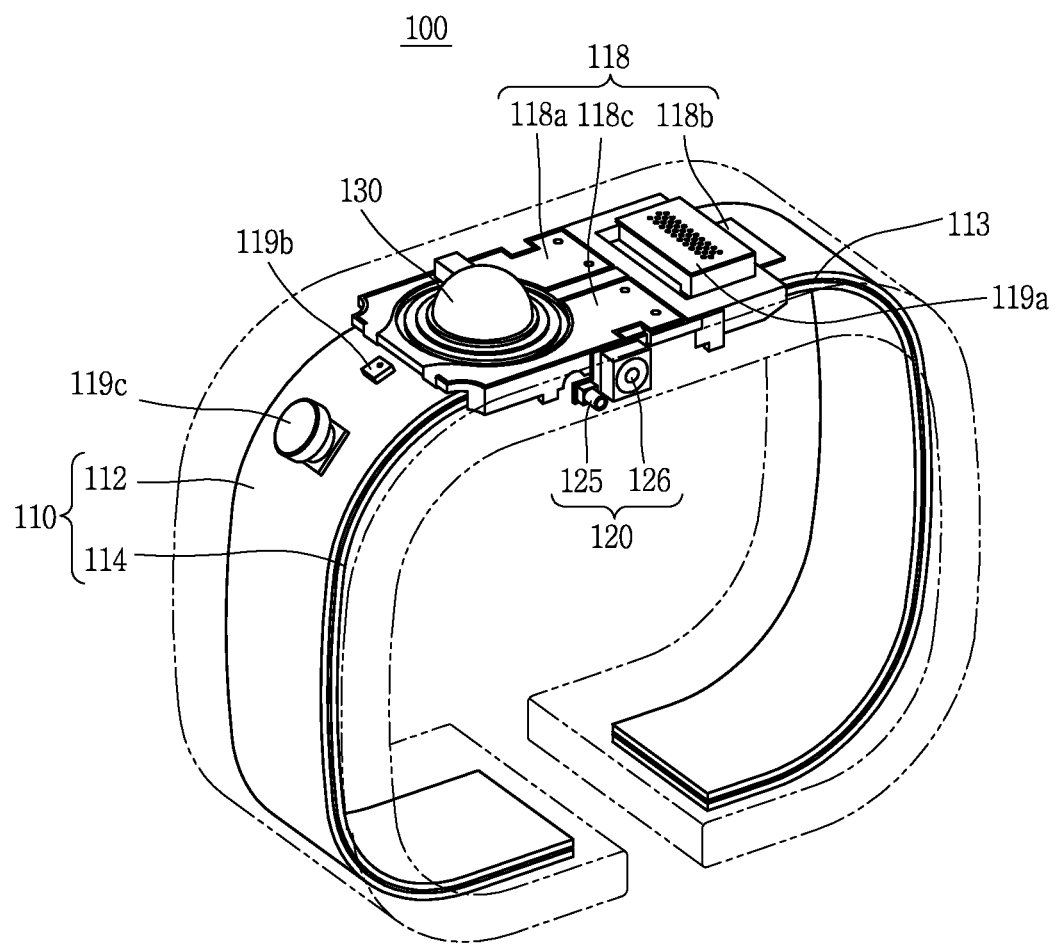
FIG. 1 is a perspective view illustrating an example of a control device according to an exemplary embodiment of the present disclosure.

Hereinafter, the embodiments of the present invention will be described with reference to the accompanying drawings, in which like numbers refer to like elements throughout although the embodiments are different, and a description of the like elements a first embodiment will be used for those of the different embodiment. In the following description, usage of suffixes such as 'module', 'part' or 'unit' used for referring to elements is given merely to facilitate explanation of the present invention, without having any significant meaning by itself. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. Also, the present invention is not limited to a specific disclosed form, but includes all modifications, equivalents, and substitutions without departing from the scope and spirit of the present invention.

It will be understood that, although the terms first, second, etc. may be used herein to describe various elements, these elements should not be limited by these terms. These terms are only used to distinguish one element from another.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing a relationship between components, that is, "between", "directly between", "neighboring to", "directly neighboring to" and the like, should be similarly interpreted.

As used herein, the singular forms "a", "an" and "the" are intended to include the plural forms as well, unless the context clearly indicates otherwise.

It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

Control devices presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of control devices. However, such teachings apply equally to other types of terminals, such as those types noted above. In addition, these teachings may also be applied to stationary terminals such as digital TV, desktop computers, digital signage, and the like.

FIG. 1 is a perspective view illustrating an example of a control device 100 according to an exemplary embodiment of the present disclosure.

The watch type control device 100 (hereinafter, referred to as a "control device 100") according to an exemplary embodiment of the present disclosure includes a band unit 110, an IR module unit 120, and a beam projector unit 130.

The band unit 110 is provided to cover at least part of a wrist, and forms a frame. The frame may be bent to have a substantially quadrangular shape. When the frame is worn on the user's wrist, the frame may restrain the control device 100 from easily rotating on the wrist.

The IR module unit 120 is disposed on the side of the band unit 110, and when the control device is worn on the user's wrist, the IR module unit 120 may be oriented toward the user's hand. The IR module unit 120 may recognize a movement of the user's hand, and may recognize a gesture of the user's hand such that a program that may be displayed through the beam projector 130 to be controlled by a gesture of the user's hand.

Thus, since the IR module 120 should recognize the user's hand, the IR module unit 120 may be provided to be movable along the band unit 110 in order to track the user's hand.

Also, the IR module unit 120 may includes an IR laser 125 formed to recognize the user's hand and a distance to the user's hand and an IR camera 126 imaging the user's hand and recognizing a gesture.

The beam projector unit 130 is disposed on an outer circumferential surface of the band unit 110, and output a screen to the outside. The screen emanated from the beam projector unit 130 may be an image captured by an external imaging device or a program driven by the control device 100.

The band unit 110 may include an outer band 112 configured to cover the wrist and an inner band 114 coupled along the outer band 112 on an inner side of the outer band 112 and brought into contact with the wrist.

The outer band 112 may include an antenna 118 for communicating with the outside. In the drawing, the antenna 118 includes a Wi-Fi antenna 118a, a Bluetooth antenna 118b, and a mobile communication antenna 118c, or alternatively, the antenna 118 may be at least any one among the Wi-Fi antenna 118a, the Bluetooth antenna 118b, and the mobile communication antenna 118c.

Also, the outer band 112 may further include a speaker 119a formed on an outer circumferential surface of the outer band 112 and generating a sound together with an image projected by the beam projector unit 130.

The outer band 112 may further include a microphone unit 119b formed on the outer circumferential surface of the outer band 112 and recording a voice when a program that can be displayed through the beam projector unit 130 is controlled or when recording is performed using the IR module unit 120 or a camera capable of capturing an image.

The microphone unit 119b may perform a recording function when imaging is performed through the camera (not shown) that may be installed in the control device 100. Also, functions of the control device 100 may be implemented through voice recognition by the microphone unit 119b.

In addition, the outer band 112 may include a key button 119c provided on the outer circumferential surface thereof such that the key button 119c is pressed or rotated to turn on or turn off power, or select various control modes.

Figure 2:
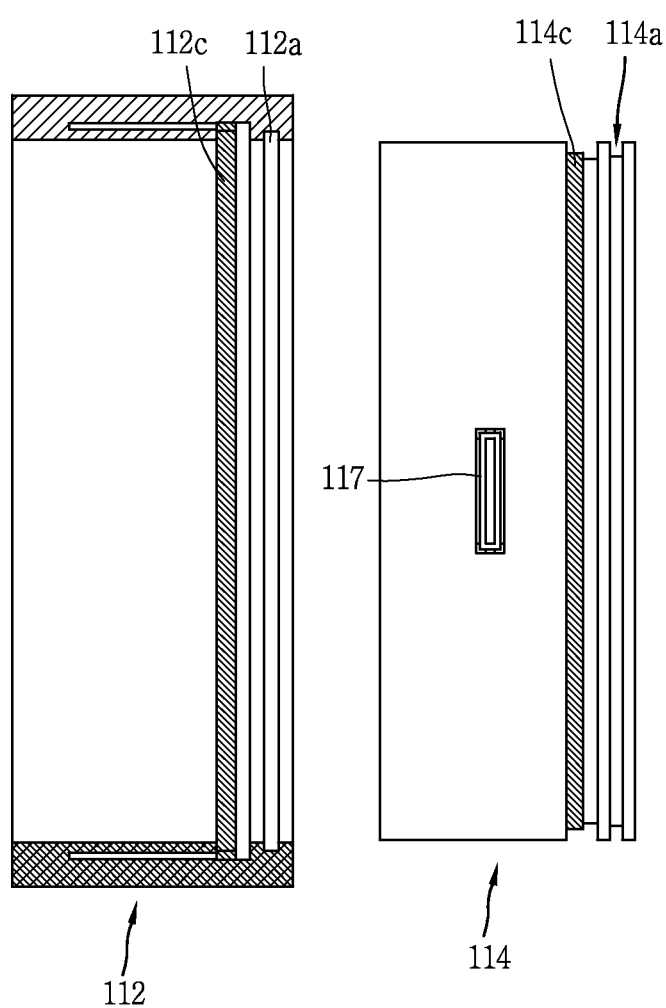
FIG. 2 is a conceptual view illustrating an example of an outer band and an inner band according to an exemplary embodiment of the present disclosure.
Figure 3:
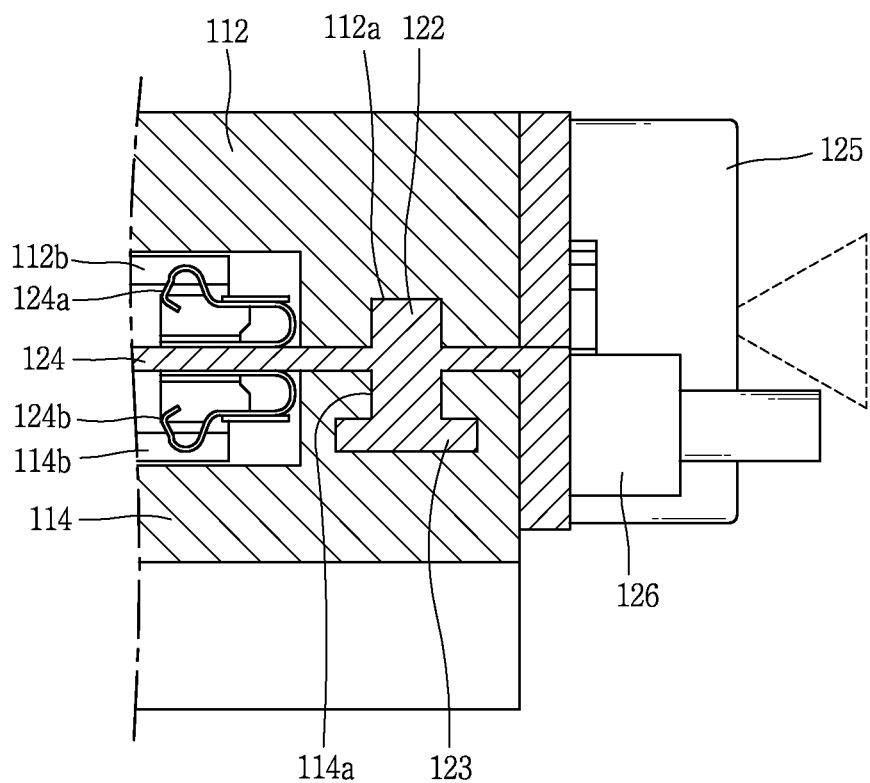
FIG. 3 is a conceptual view illustrating a cross-section of a band unit and an IR module unit according to an exemplary embodiment of the present disclosure.
Figure 4:
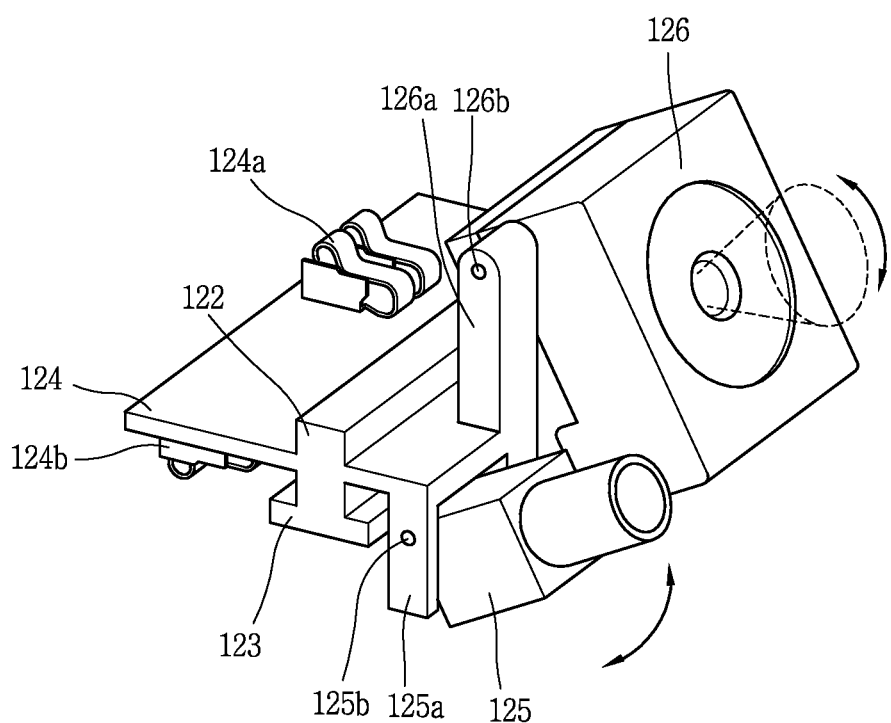
FIG. 4 is a perspective view illustrating an example of the IR module unit according to an exemplary embodiment of the present disclosure.

FIG. 2 is a conceptual view illustrating an example of the outer band 112 and the inner band 114 according to an exemplary embodiment of the present disclosure, FIG. 3 is a conceptual view illustrating a cross-section of the band unit 110 and the IR module unit 120 according to an exemplary embodiment of the present disclosure, and FIG. 4 is a perspective view illustrating an example of the IR module unit 120 according to an exemplary embodiment of the present disclosure.

First, referring to FIG. 2, an inner circumferential surface of the outer band 112 is illustrated on the left of the drawing, and an outer circumferential surface of the inner band 114 is illustrated on the right of the drawing.

The outer band 112 may include a first rail unit 112a formed to be recessed inwardly on the inner circumferential surface of the outer band 112. The first rail unit 112a and a second rail unit 114a (to be described hereinafter) form a rail unit 113 (please refer to FIG. 1) in which the IR module unit 120 may be inserted to be moved.

The inner band 114 may include the second rail unit 114a formed to be recessed inwardly on the outer circumferential surface facing the outer band 112. The second rail unit 114a may be disposed in a position corresponding to the first rail unit 112a. The IR module unit 120 may be inserted between the outer band 112 and the inner band 114 and move along the side of the band unit 110.

Each of the outer band 112 and the inner band 114 may include first and second contact paths 112c and 114c which are electrically in contact with the IR module unit 120 although the IR module unit 120 moves along the band unit 110. The first and second contact paths 112c and 114c may be disposed to be parallel to the first and second rail units 112a and 114a.

A connection pin 117 may be provided in the inner band 114 and electrically connected to the outer band 112. The connection pin 117 may be coupled to a connection terminal (not shown) of the outer band 112 to electrically connect the inner band 114 and the outer band 112.

Referring to FIG. 3, a first PCB 112b may be disposed within the outer band 112 and adjacent to the inner band 114, and a second PCB 114b may be disposed within the inner band 114 and adjacent to the outer band 112.

The IR module unit 120 may include a guide plate 122 inserted into the first and second rail units 112a and 114a and moved on the band unit 110.

Also, the IR module unit 120 includes a contact plate 124 extending between the outer band 112 and the inner band 114 and being at a predetermined angle with the guide plate 122. The contact plate 124 may include a first terminal 124a provided to come into contact with the first PCB 112b and a second terminal 124b provided to come into contact with the second PCB 114b.

The first terminal 124a and the second terminal 124b may be disposed on the mutually opposite sides of the contact plate 124 such that the first terminal 124a and the second terminal 124b are stably in contact with the first PCB 112b and the second PCB 114b.

The first and second PCBs 112*b* and 114*b* are electrically connected to the first and second contact paths 112*c* and 114*c*, so that when the first and second contact paths 112*c* and 114*c* and the IR module unit 120 are electrically connected, the IR module unit 120 may be electrically connected to the first and second PCBs 112*b* and 114*b*. Thus, when the first terminal 124*a* and the second terminal 124*b* come into contact with the first and second contact paths 112*c* and 114*c*, the first terminal 124*a* and the second terminal 124*b* may be electrically in contact with the first PCB 112*b* and the second PCB 114*b*, respectively.

A wobble preventing protrusion 123 may be provided on at least one end portion of the guide plate 122. The wobble preventing protrusion 123 may be bent to extend outwardly from the guide plate 122 in order to prevent the IR module unit 120 from wobbling on the rail unit 113. The wobble preventing protrusion 123 may extend from one end portion of the guide plate 122 in a direction parallel to the contact plate 124.

Referring to FIG. 4, as mentioned above, the IR module unit 120 may include the IR laser 124 provided to recognize a user's hand and a distance to the user's hand and the IR camera 126 imaging the user's hand to recognize a gesture.

The IR camera 126 and the IR laser 125 may be rotatably provided in the band unit 110 such that they may be able to continuously recognize the user's hand in response to a change in a position of the user's hand. Through the rotation, the IR module unit 120 may enhance restore recognition with respect to the user's hand.

The IR camera 126 may be provided to be rotatable about a rotational shaft 126*b* provided on one side of a first support plate 126*a*. The IR laser 125 may be provided to be rotatably about a rotational shaft 125*b* provided on one side of a second plate 125*a*.

Figure 5:
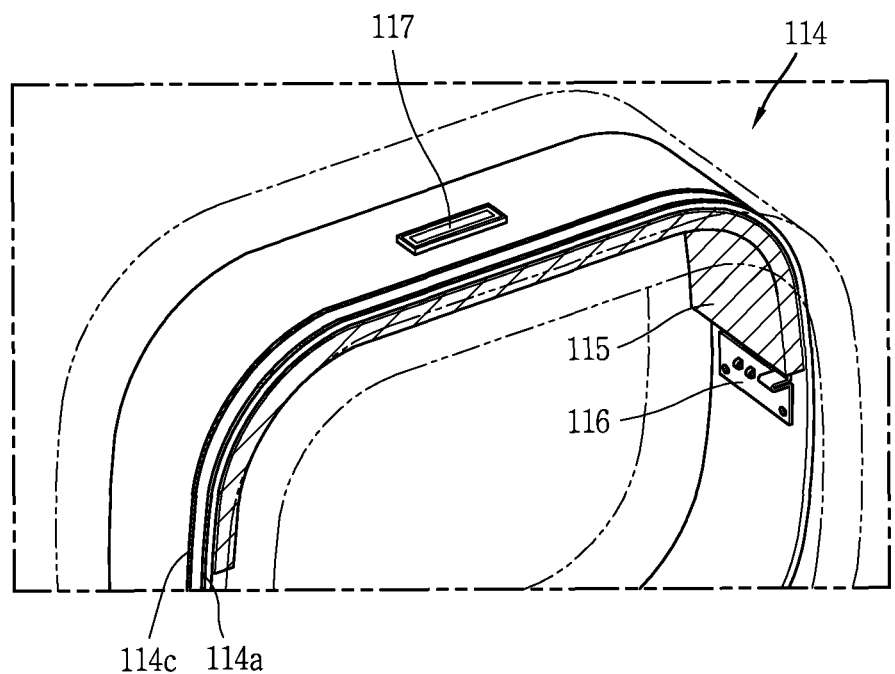
FIG. 5 is a conceptual view illustrating an example of an inner band according to an exemplary embodiment of the present disclosure.

FIG. 5 is a conceptual view illustrating an example of the inner band 114 according to an exemplary embodiment of the present disclosure.

Referring to FIG. 5, the inner band 114 may include a battery 115, a battery terminal 116, and a connection pin.

The battery 115 may be disposed along an inner surface of the inner band 114. The battery terminal 116 may be formed on one end portion of the battery 115. The battery 115 may be charged through the battery terminal 116. However, unlike the positions of the battery 115 and the battery terminal, the battery 115 and the battery terminal 116 may be provided on the outer band 112. In addition, the battery terminal 116 may be provided on an outer side of the outer band 112 such that the control device 100 may be used while the battery 115 is being charged through the battery terminal 116.

The connection pin may be provided on the outer circumferential surface of the inner band 114 so as to be electrically coupled to the outer band 112.

Figure 6A:
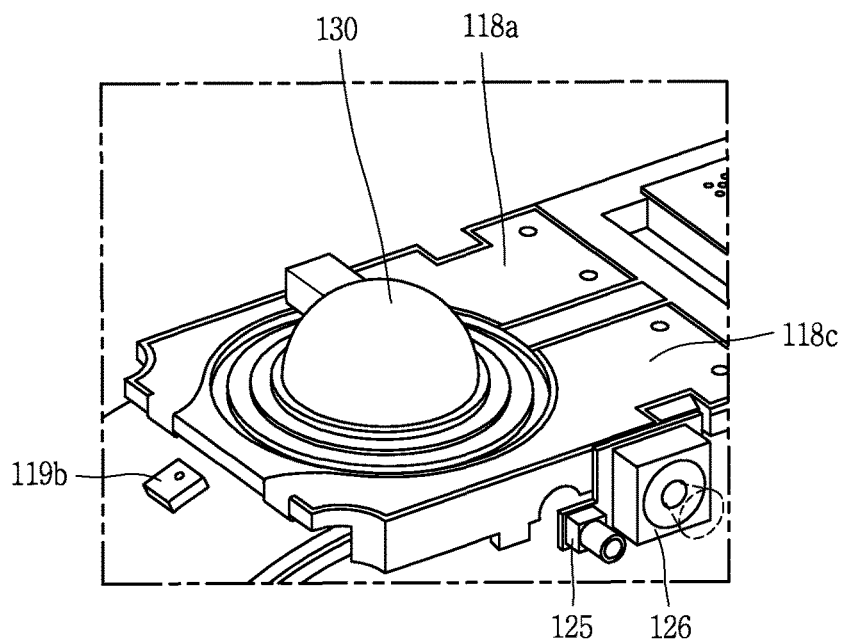
FIGS. 6A and 6B are partial perspective views illustrating a configuration in which a beam projector unit rotates according to an exemplary embodiment of the present disclosure.
Figure 6B:
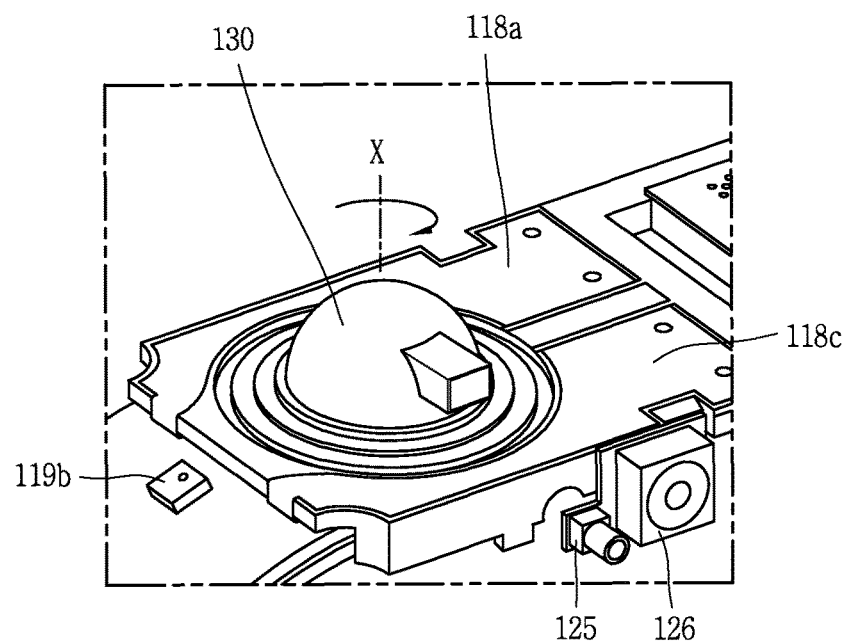

FIGS. 6A and 6B are partial perspective views illustrating a configuration in which the beam projector unit 130 rotates according to an exemplary embodiment of the present disclosure.

The beam projector unit 130 may be disposed on an outer circumferential surface of the outer band 112 and may be provided as a ball type that can rotate to output screen information to an intended place.

The beam projector unit 130 may be provided as a ball type and rotate by 360 degrees about an X axis. Also, the beam projector unit 130 may rotate in an X axis direction so as to be rotatable in an intended direction in which screen information is to be output.

Figure 7A:
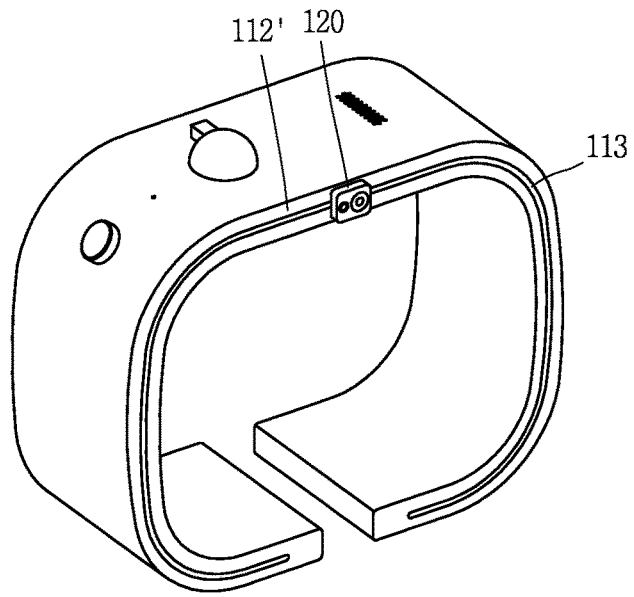
FIGS. 7A and 7B are conceptual views illustrating a configuration in which the IR module unit moves on a side surface of a band unit in the control device illustrated in FIG. 1 according to an exemplary embodiment of the present disclosure.
Figure 7B:
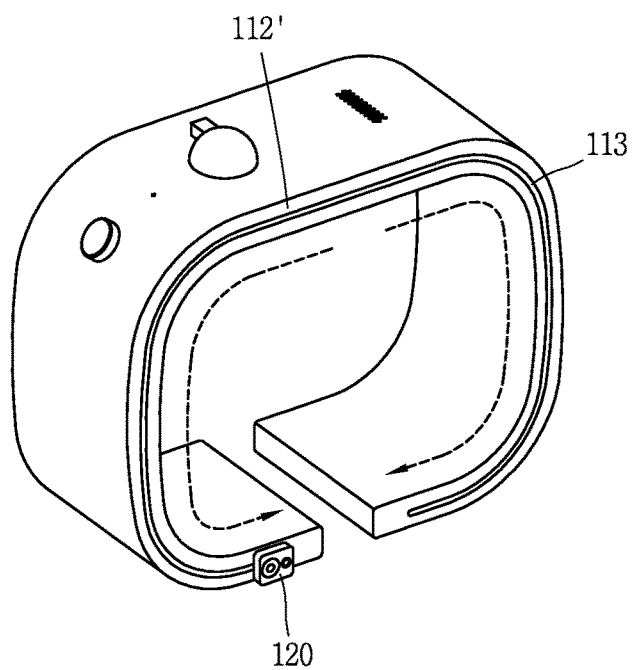

FIGS. 7A and 7B are conceptual views illustrating a configuration in which the IR module unit 120 moves on a side surface of the band unit 110 in the control device illustrated in FIG. 1 according to an exemplary embodiment of the present disclosure.

The IR module unit 120 may be movable along the rail unit 113 on the side surface of the band unit 110. Also, even though the IR module unit 120 moves, the IR module 120 may be continuously electrically connected to the first and second PCBs 112*b* and 114*b* through the first and second contact paths 112*c* and 114*c*. Accordingly, power may be supplied to the IR module unit 120 and information obtained from the IR module unit 120 may be processed by a control unit.

Also, in a case in which the IR module unit 120 may not smoothly recognize the user's hand according to directions in which the control device 100 is disposed on the user's wrist, the IR module unit 120 may rotate to recognize a position of the user's hand and recognize a gesture using the user's finger, or the like, through the IR camera 126.

FIGS. 8A through 8F are conceptual views illustrating examples in which the control device 100 outputs a screen and recognizes a hand according to an exemplary embodiment of the present disclosure.

Figure 8A:
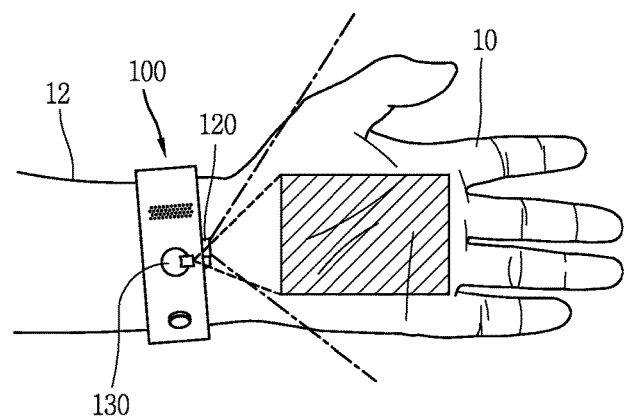
FIGS. 8A through 8F are conceptual views illustrating examples in which the control device outputs a screen and recognizes a hand according to an exemplary embodiment of the present disclosure.

FIG. 8A is a view illustrating a configuration in which a screen is displayed on the user's palm by using the beam projector unit 130 and a finger gesture of the user is recognized through the IR module unit 120 to control a program displayed on the screen.

Figure 8B:
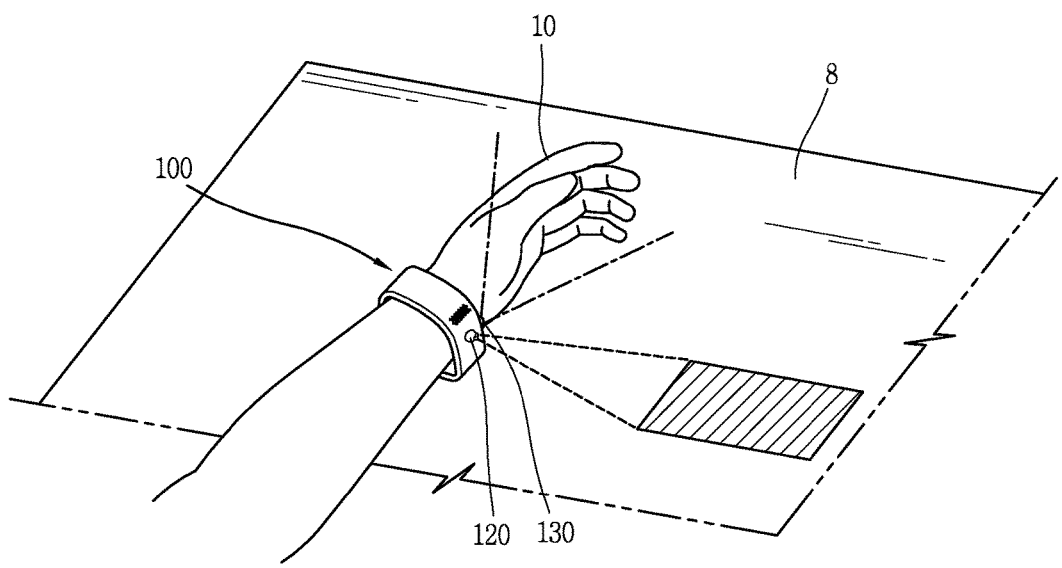

FIG. 8B is a view illustrating a configuration in which the beam projector unit 130 is rotated to display a screen on the floor 8 and recognize a finger gesture of the user through the IR module unit 120 to control a program displayed on the screen.

Figure 8C:
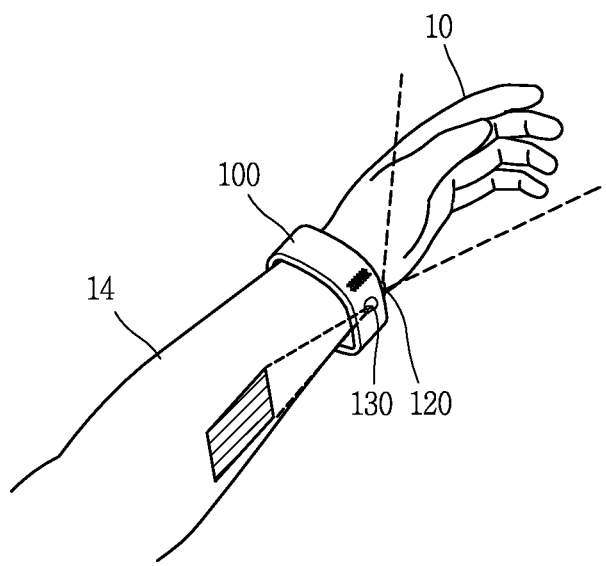

FIG. 8C is a view illustrating a configuration in which a screen is displayed on an inner portion of the user's arm and a finger gesture of the user is recognized through the IR module unit 120 to control a program displayed on the screen.

Figure 8D:
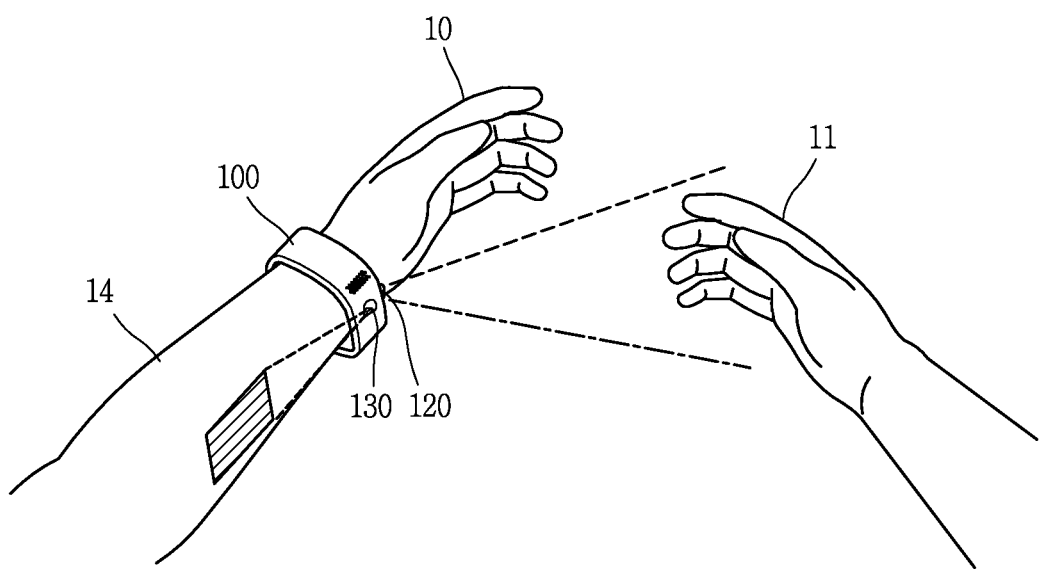

FIG. 8D is a view illustrating a configuration in which a screen is displayed on an outer portion of the user's arm 14 and a finger gesture of the user is recognized in a position in which fingers of a hand 11 on which the user does not wear the watch type control device 100 through rotation of the IR module unit 120, to control a program displayed on the screen.

Figure 8E:
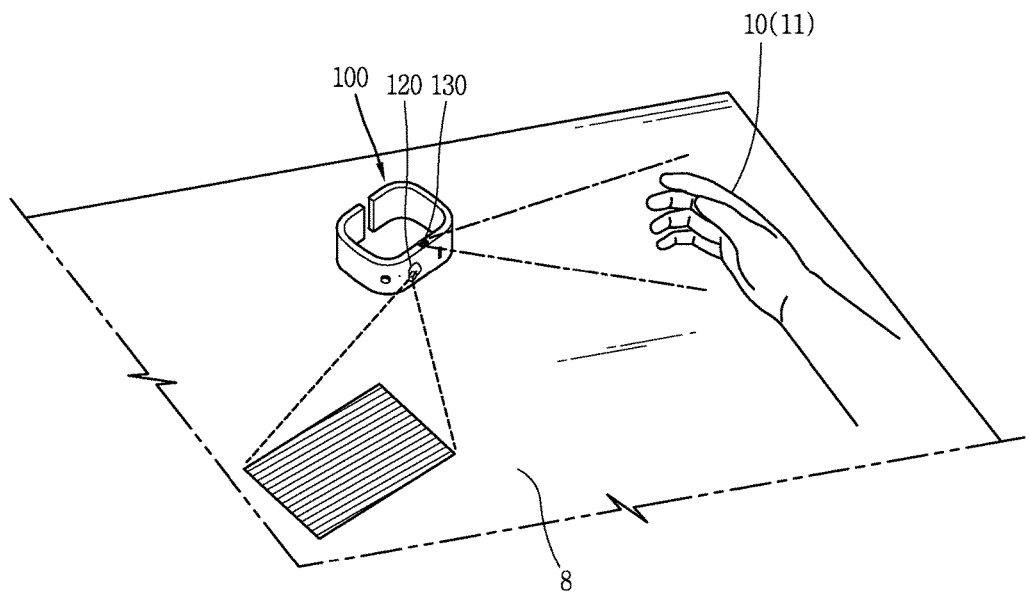

FIG. 8E is a view illustrating a configuration in which the watch type control device 100 is placed on the floor, the beam projector unit 130 displays a screen on the floor, and the user controls a program displayed on the screen by a finger gesture in a position in which the IR module unit 120 may recognize fingers of the user, from above the watch type control device 100.

Figure 8F:
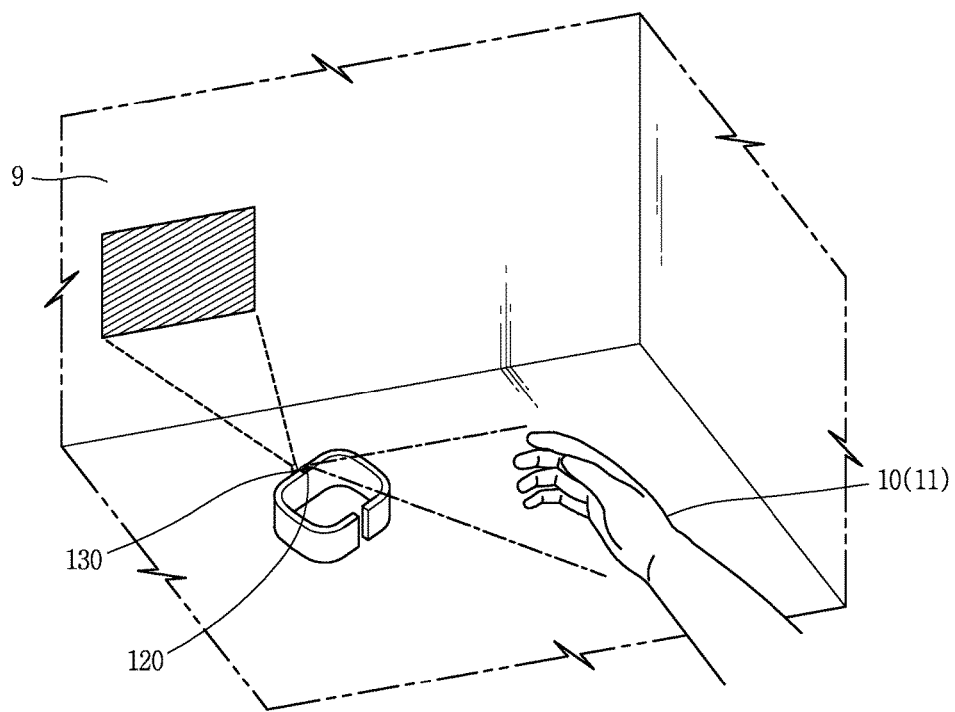

FIG. 8F is a view illustrating a configuration in which the watch type control device 100 is placed on the floor, the beam projector unit 130 displays a screen on a wall surface, and the user controls a program displayed on the screen by a finger gesture in a position in which the IR module unit 120 may recognize fingers of the user, from above the watch type control device 100.

Also, a dynamic scene (image) of sports, or the like, may be captured as video by using the IR camera 126 or installing a camera (not shown) in the band unit 110. The captured video may be easily checked on a screen through the beam projector unit 130. As soon as the image is captured through this process, the image may be checked. Of course, a dynamic image of sports, or the like, may be captured by using a general camera, or the like, and transmitted to the control device 100 so as to be checked.

In addition, by forming an image on the user's hand or arm as illustrated in FIG. 8A or 8C, the user may easily view video or use the Internet even while on the move or even in a crowded location.

FIGS. 9A through 10B are conceptual views illustrating examples of controlling a program through an operation of the control device 100 according to an exemplary embodiment of the present disclosure.

In exemplary embodiments illustrated in FIG. 9, the watch type control device 100 may be used for the purpose of controlling by using a gesture, by pairing the display device 7 such as a TV or a monitor and the watch type control device 100 using Bluetooth or a Wi-Fi antenna 118a.

However, unlike those illustrated, a screen displayed using the beam projector 130 may also be controlled as follows.

Figure 9A:
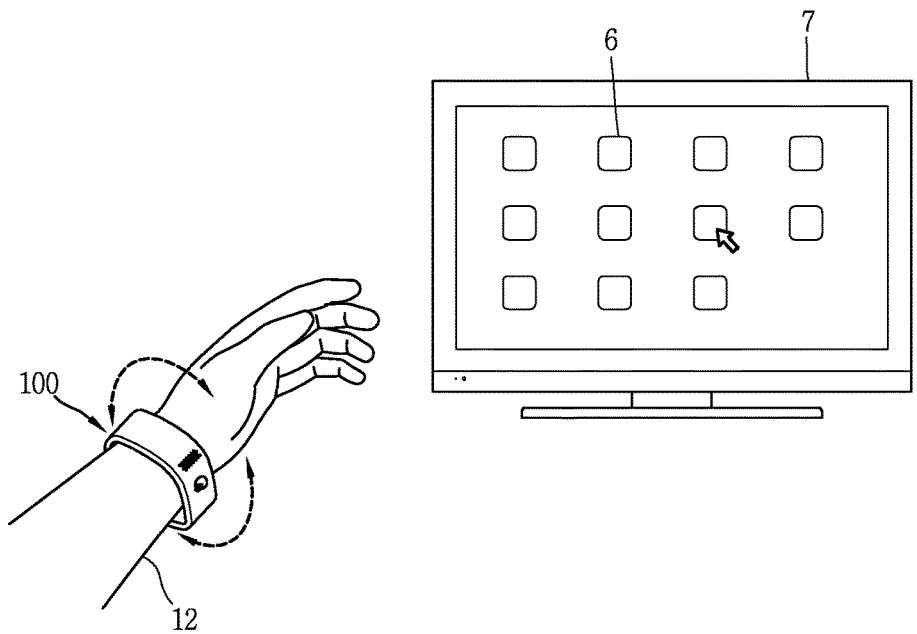
FIGS. 9A through 10B are conceptual views illustrating examples of controlling a program through an operation of the control device according to an exemplary embodiment of the present disclosure.

As illustrated in FIG. 9A, a particular application 6 or a program may be entered through an operation (rotating) of twisting the wrist 12 in one direction and subsequently twisting the wrist 12 in the opposite direction. That is, while a certain screen is being output, when the user twists his or her wrist on which the watch type control device 100 worn, various icons may be displayed on the screen (entering a control mode).

In addition, in order to control a program by applying a particular impact to the watch type control device 100, rather than a finger's movement, a gravity sensor (not shown) may be installed within the watch type control device 100.

Also, the watch type control device 100 may be paired with other devices through Wi-Fi or Bluetooth, and also, in this case, the paired device may be controlled. For example, when the watch type control device 100 is paired with a vehicle, the operation of twisting the wrist illustrated in FIG. 9 A may control to start the engine of the vehicle.

Figure 9B:
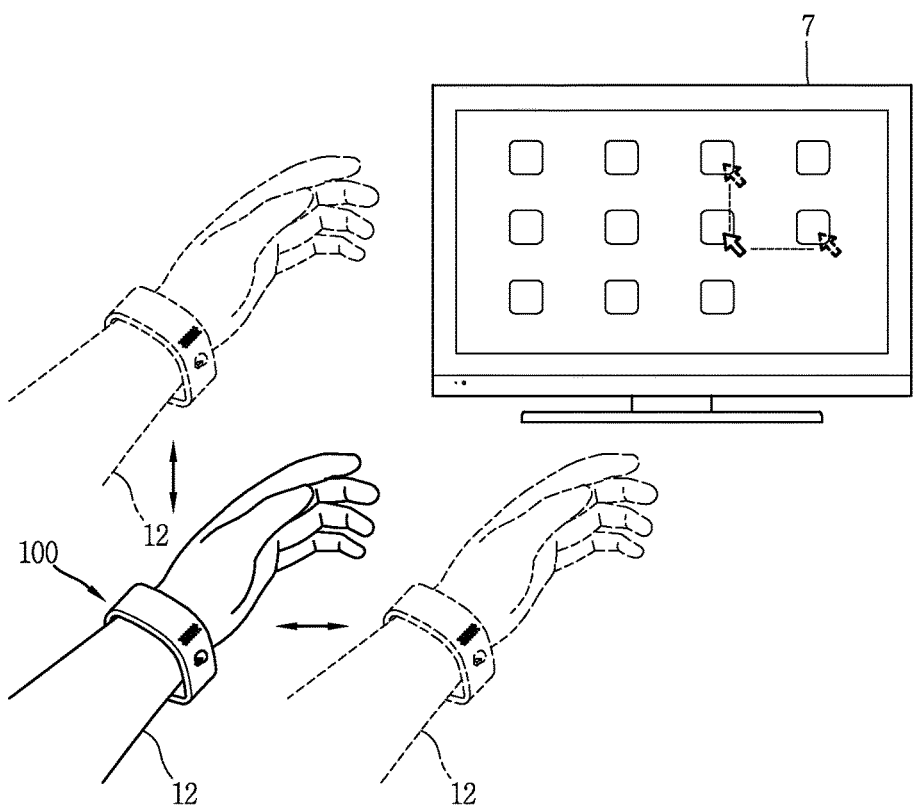

Meanwhile, as illustrated in FIG. 9B, when the user's wrist moves in an upward or downward direction or moves in a leftward or rightward direction in a basic screen of a program, a cursor displayed on the screen may be moved together. Also, even when a hand is moved without the operation of twisting the wrist, the cursor may be created and moved.

Figure 10A:
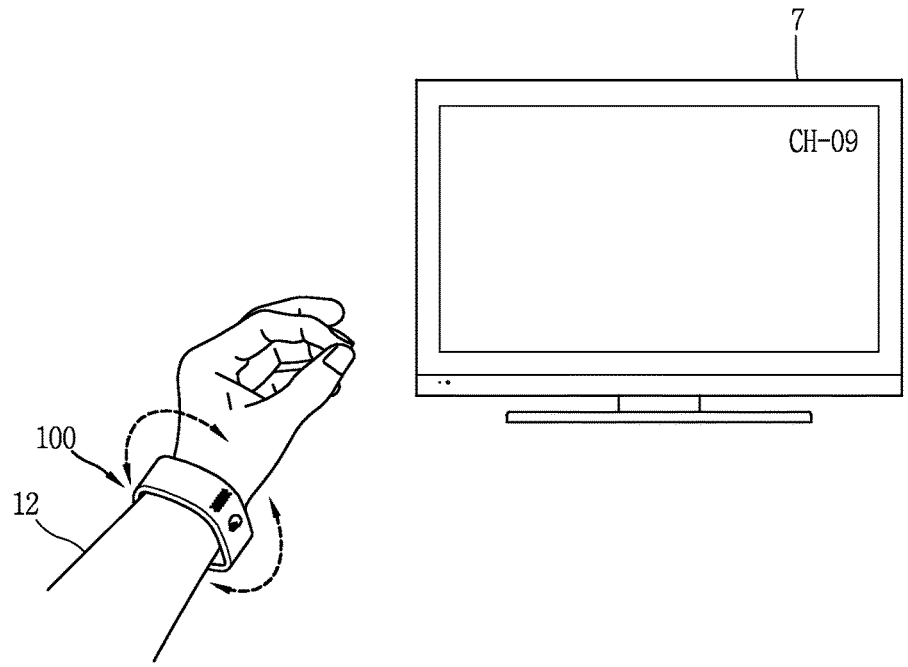
Figure 10B:
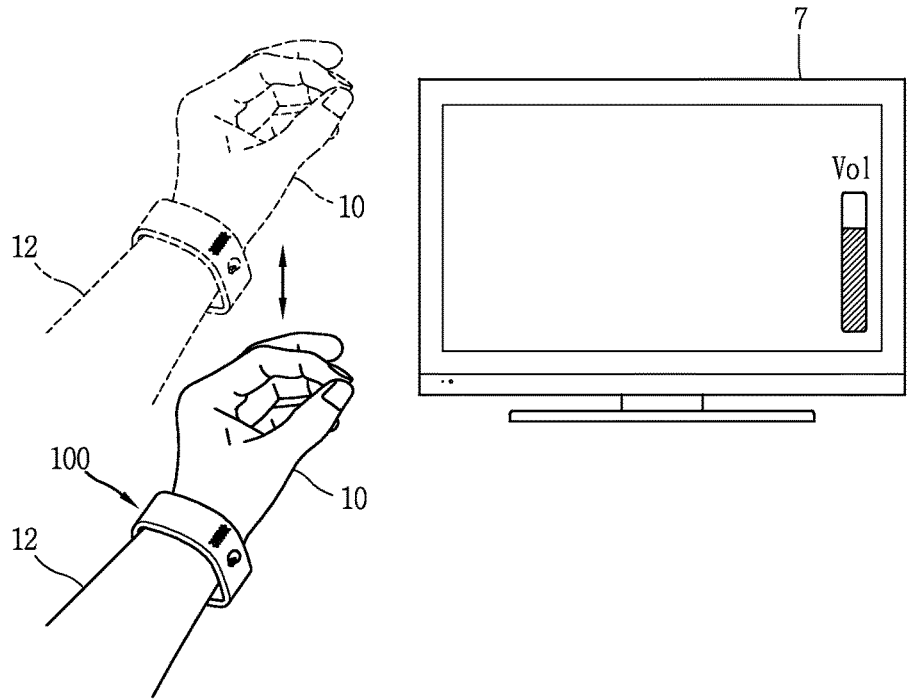

Meanwhile, as illustrated in FIG. 10A, when the wrist is rotated in a state in which the thumb and the index finger are in contact, a channel may be changed, and as illustrated in FIG. 10B, when the hand with the thumb and the index finger in contact with each other is lifted or lowered, a size (volume) of a sound may be increased or decreased.

Figure 11A:
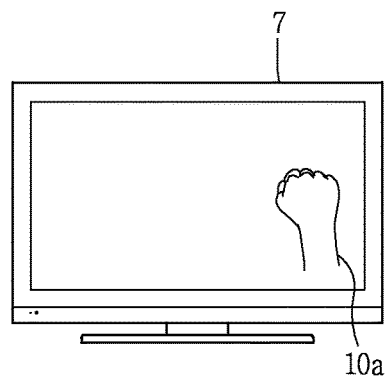
FIGS. 11A through 12 are conceptual views illustrating examples of controlling a program through a hand gesture with respect to the control device according to an exemplary embodiment of the present disclosure.
Figure 11A:
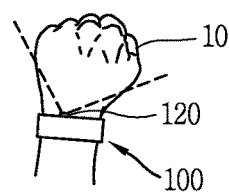
Figure 11B:
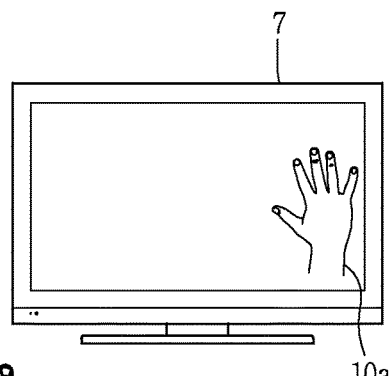
Figure 11B:
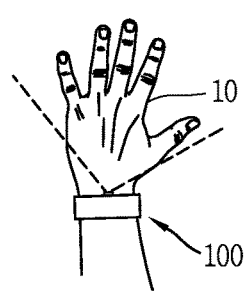
Figure 11C:
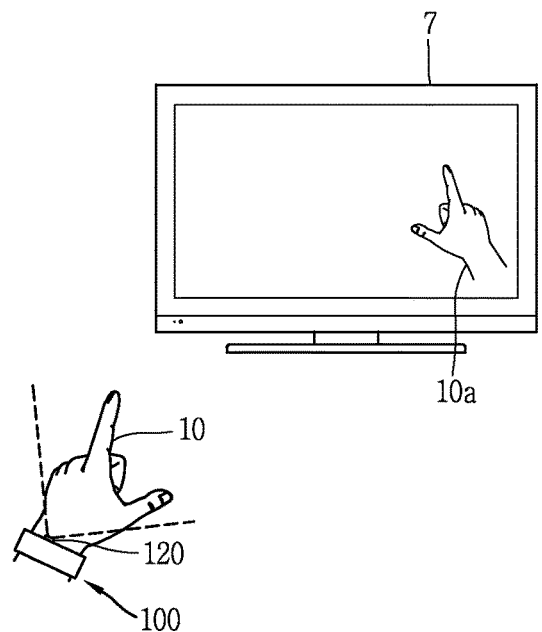
Figure 11D:
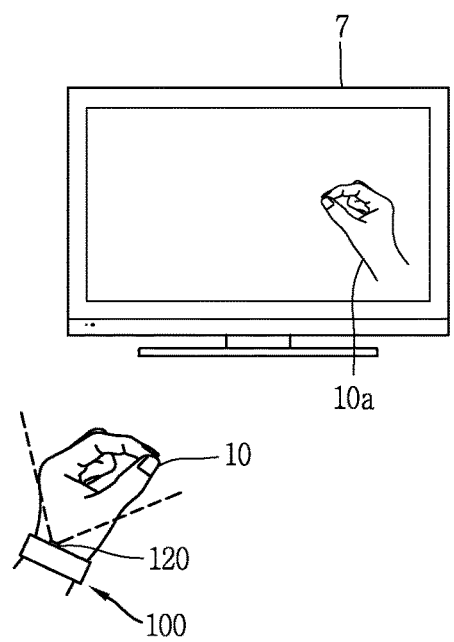
Figure 12:
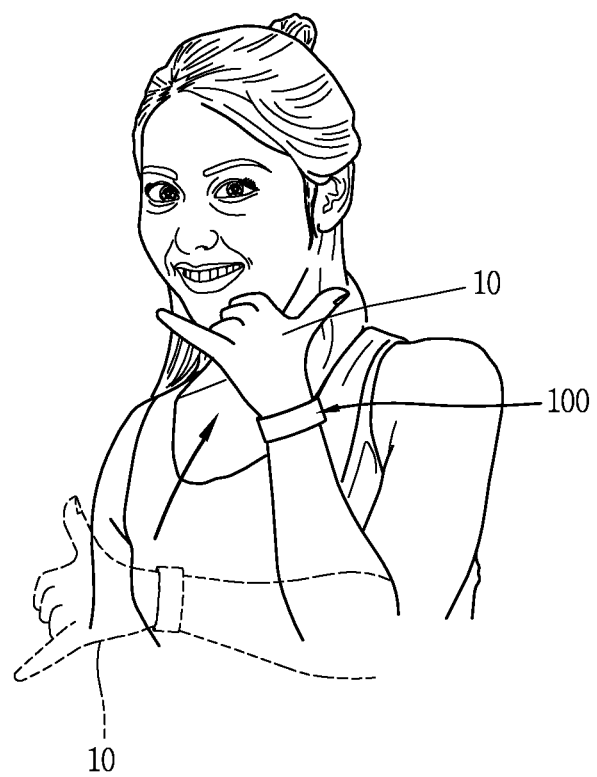

FIGS. 11A through 12 are conceptual views illustrating examples of controlling a program through a hand gesture with respect to the control device 100 according to an exemplary embodiment of the present disclosure.

In the exemplary embodiments illustrated in FIG. 11A through 11D, the watch type control device 100 may be used for a control purpose using a gesture by paring the watch type device 100 with a TV, a monitor, or the like. However, unlike that illustrated in the drawing, a screen displayed using a beam projector unit 130 may also be controlled as follows.

In FIG. 11, a function of an executed program may be controlled through a specific gesture of a user's finger. Also, a virtual hand similar to the shape of the user's hand may be displayed on the display to guide controlling through a finger gesture.

FIG. 11A illustrates that fingers are folded to make a fist (fist). FIG. 11B illustrates that the all the fingers are unfolded (flat). FIG. 11C illustrates that a particular object are pointed using the index finger (pointing). FIG. 11D illustrates that the thumb and the index finger are in contact (pinching). In addition to the gestures illustrated in the drawings, various other gestures may also be stored and functions such as movement, selection, magnification, reduction, making a call, and the like, may be controlled using the gestures.

For example, reduction may be made through the gesture of FIG. 11A, magnification may be made through the gesture of FIG. 11B, and selection may be made through the gestures of FIGS. 11C and 11D. Also, when the motion of FIG. 11C is repeated twice, a selected application may be executed. In a state in which the motion of FIG. 11D is executed, when the hand is moved, a function such as drag may be performed.

In addition, characters may be input through a preset particular gesture.

Also, the watch type control device 100 may be paired with other devices at homes through Wi-Fi, Bluetooth, and the like, and also, in this case, the paired device may be controlled. For example, when a lamp in a house is paired with the control device 100, the particular lamp may be selected through the motion of FIG. 11C, and the selected lamp may be turned off through the motion of FIG. 11A or turned on through the motion of FIG. 11B.

Also, when a door of the house is paired with the control device 100, the door may be selected through the motion of FIG. 11C, and a lock as an electronic device of the door may be locked or unlocked through the rotational motion illustrated in FIG. 9A.

When the watch type control device 100 is paired with a vehicle, the motion of twisting the wrist illustrated in FIG. 11A may control starting of an engine of a vehicle.

Also, a function to make a call or receive a call may be performed through a gesture of spreading the thumb and the ring finger and putting the thumb to the user's ear and the ring finger to the user's mouth, as shown in FIG. 12.

FIGS. 13 through 16 are conceptual views illustrating examples of using the control device 100 according to an exemplary embodiment of the present disclosure.

Figure 13:
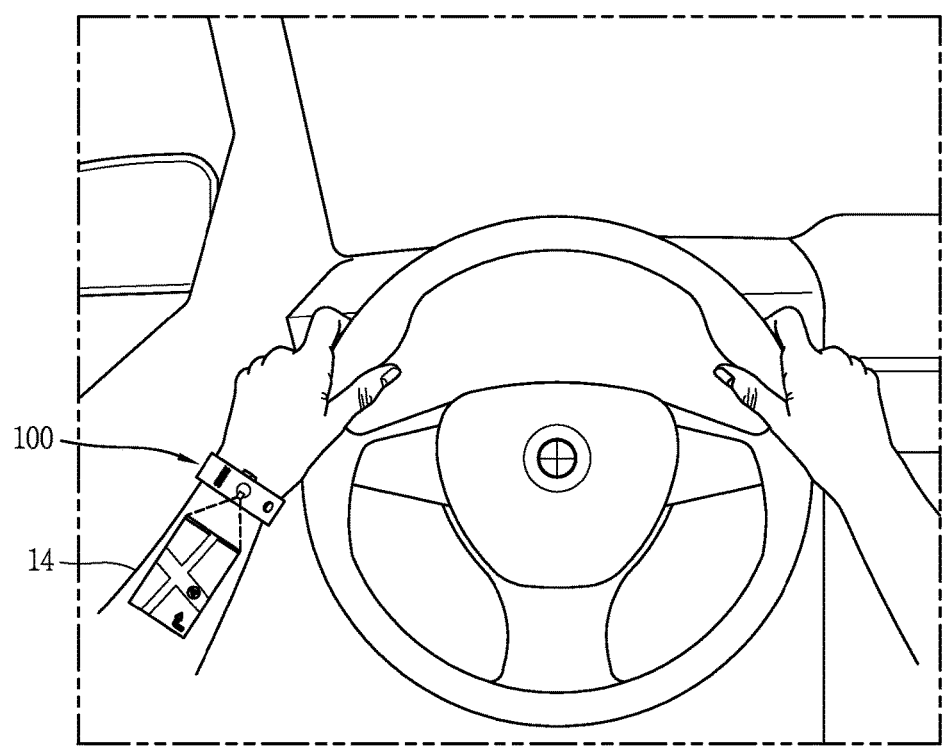
FIGS. 13 through 16B are conceptual views illustrating examples of using the control device according to an exemplary embodiment of the present disclosure.

FIG. 13 is a view illustrating execution of a navigation function by displaying a map image on the user's arm through the watch type control device 100. also, the user may take off the control device 100 and control the navigation to be displayed on the windscreen of a vehicle. Also, as described above, when the watch type control device 100 is pared with the vehicle, the engine of the vehicle may be started through a motion of twisting of the wrist. In addition, such a navigation function may also be used in a motorcycle, a bicycle, and the like.

Figure 14:
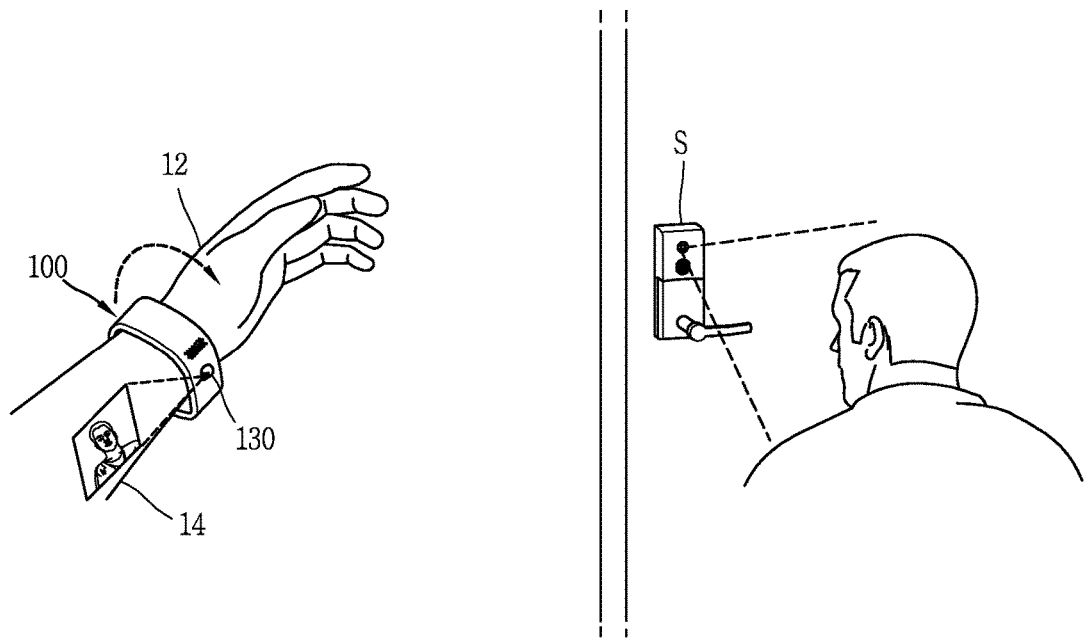
Figure 15:
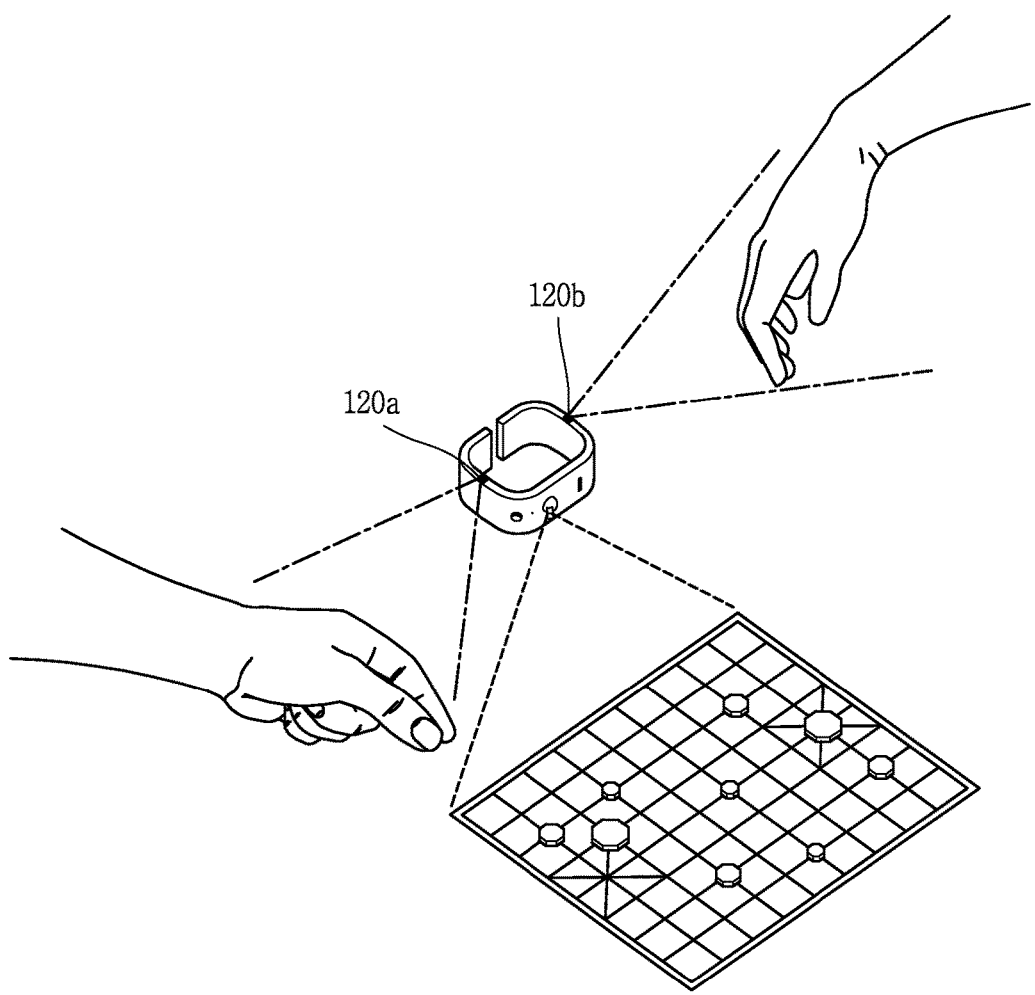

FIG. 14 is a view illustrating that a door is controlled by pairing the control device 100 with an interphone S through which the user's figure may be checked, or the like. As described above, when the control device 100 is paired with the door, the door may be opened through a motion (rotating) of twisting the wrist 12. Also, when a visitor presses the interphone, or the like, an image captured by a camera of the interphone may be received by the control device 100 through pairing and displayed through a projector. Thereafter, the door may be opened by rotating the hand or the wrist 12.

FIG. 12 illustrates that two or more people play a game through the control device 100.

In case of playing a game such as go, janggi, chess, and the like, a projector may display a board on the floor and the users may move the checkers or stone checkers through a gesture. In addition, the IR module unit 120 may be additionally installed in the rail unit. Here, two IR module units 120*a* and 120*b* may sense hand gestures of the two persons. Also, as described above, both IR module units 120*a* and 120*b* may be electrically brought into contact with the first and second PCBs 112 through the contact paths. In this case, a game allowing for a real time competition may be played.

In addition, without an addition of the IR module unit 120, the IR module unit 120 may be rotated according to a rotation of the user, to sense a counterpart user.

Figure 16A:
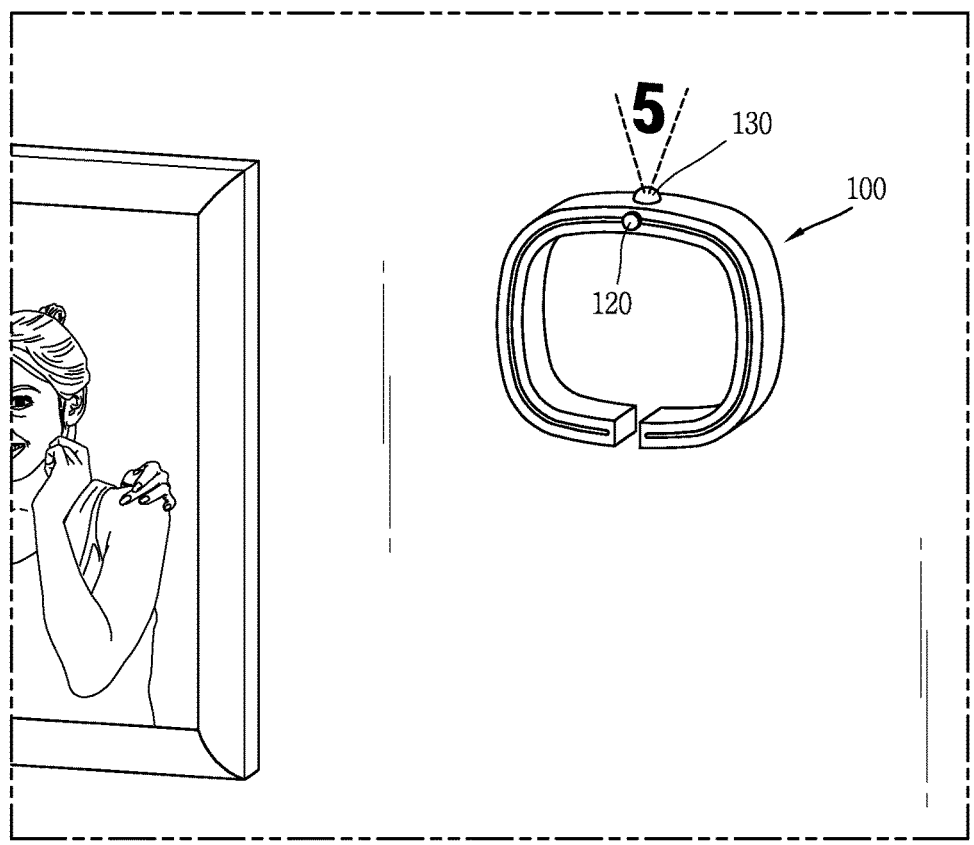
Figure 16B:
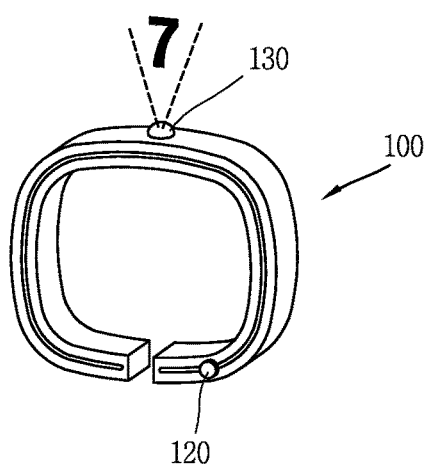

FIGS. 16A and 16B illustrate that the control device 100 may be hung up on the wall and hour is displayed by numbers outwardly with a projector and minute is displayed inwardly through an IR laser 125, while rotating the IR module, whereby the control device 100 may be utilized as a wall-mounted watch.

In addition, when a day schedule is input according to time zones, things to do may be displayed by using the beam projector unit 130 and the IR laser 125.

Figure 17:
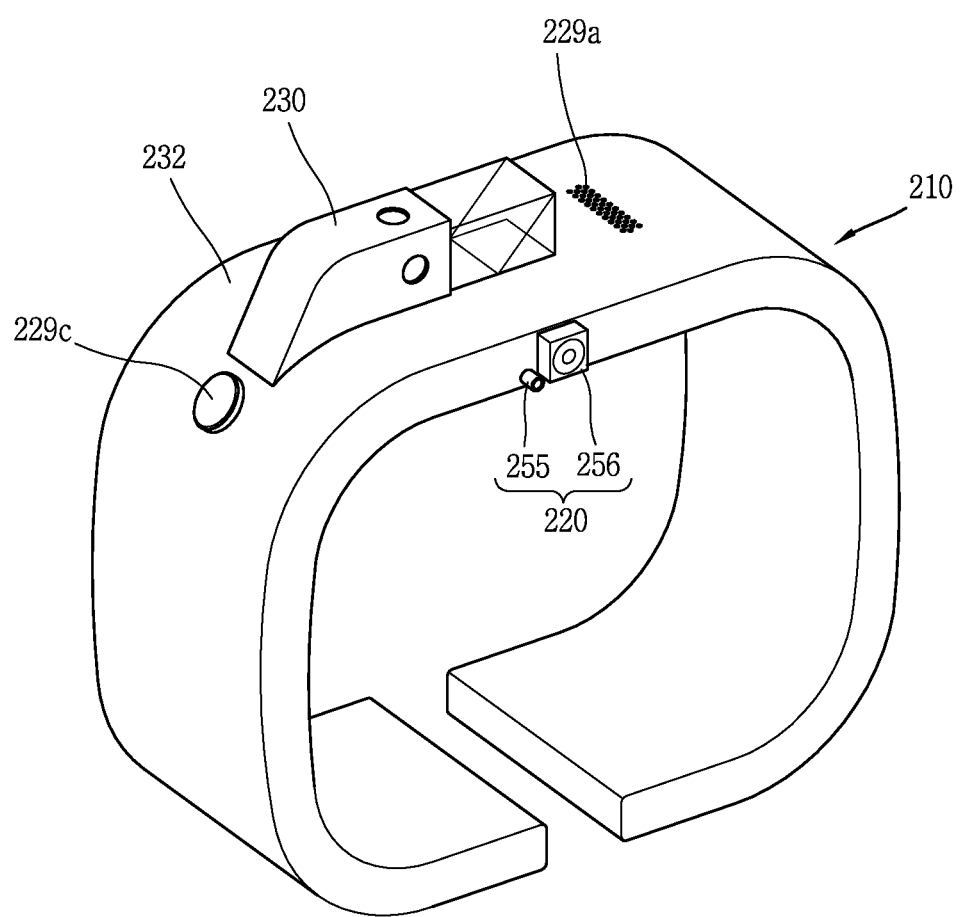
FIG. 17 is a conceptual view illustrating a control device according to another exemplary embodiment of the present disclosure.
Figure 18A:
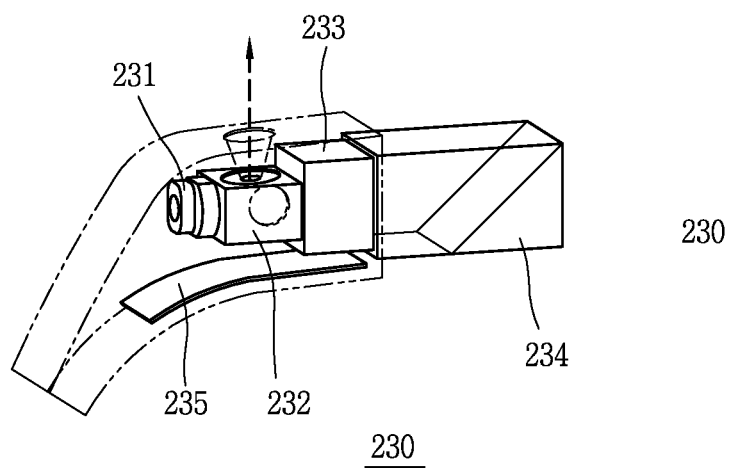
FIGS. 18A through 18D are conceptual views illustrating details of a beam projector unit module illustrated in FIG. 17.
Figure 18B:
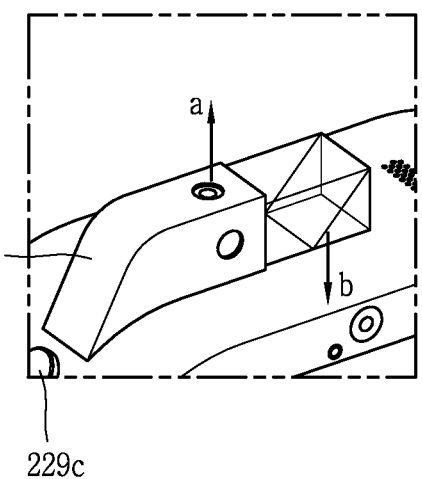
Figure 18C:
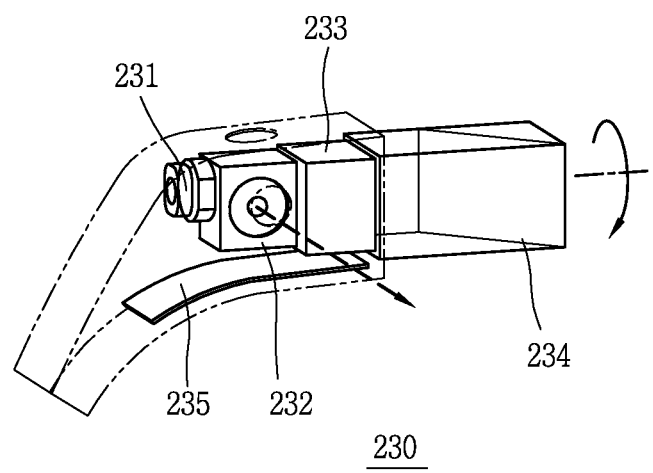
Figure 18D:
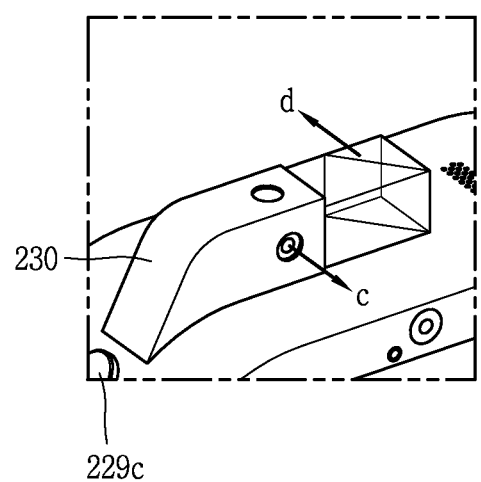
Figure 19:
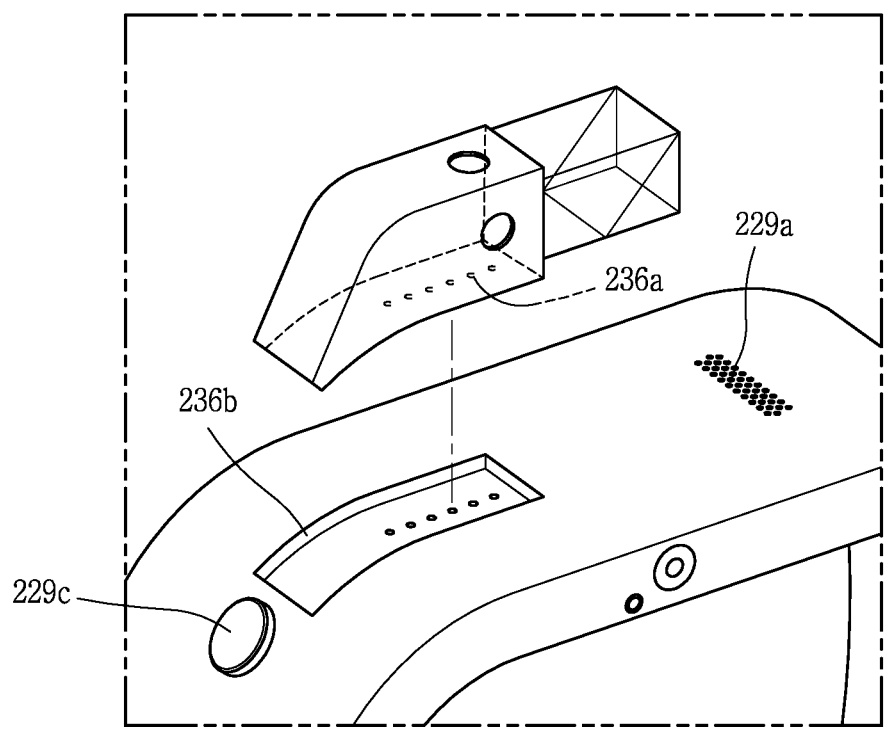
FIG. 19 is a conceptual view illustrating a process of coupling the beam project unit module illustrated in FIG. 17 and a band unit.

FIG. 17 is a conceptual view illustrating a control device according to another exemplary embodiment of the present disclosure, FIGS. 18A through 18D are conceptual views illustrating details of a beam projector unit module illustrated in FIG. 17, and FIG. 19 is a conceptual view illustrating a process of coupling the beam project unit module illustrated in FIG. 17 and a band unit.

FIG. 17 is a conceptual view illustrating a control device according to another embodiment of the present disclosure. FIG. 18 is a conceptual view illustrating details of a beam projector unit 230 module illustrated in FIG. 17. FIG. 19 is a conceptual view illustrating a structure in which the beam projector unit 230 module illustrated in FIG. 17 and the band unit 210 are coupled.

Referring to FIGS. 17 through 20, a configuration in which the beam projector unit 230 according to an exemplary embodiment of the present disclosure is coupled to the band unit 210.

The beam projector unit 230 may be provided as a module that can be detachably attached to an outer circumferential surface of an outer band 232. The beam projector unit 230 may be configured such that the user may detachably attach it to glasses 20, and configured to project a screen to a glass 22 of the glasses 20.

Referring to FIG. 18, the beam projector unit 230 includes a hinge 231, a camera 232, a projector 233, and a prism 234.

The camera 232 is configured to image the outside. The projector 233 is provided to be adjacent to the camera 232, and outputs a screen image toward the prism 234. The prism 234 changes a direction of the screen such that the screen image is output in a direction opposite to the direction in which the camera 232 captures the screen image.

Figure 20:
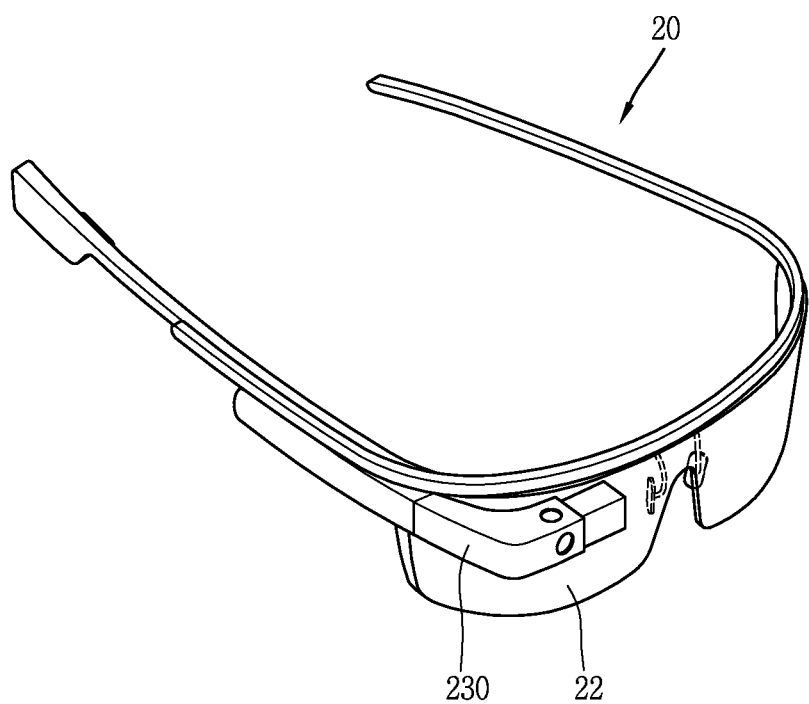
FIG. 20 is a perspective view illustrating a configuration in which the beam projector unit module according to an exemplary embodiment of the present disclosure is coupled with glasses.

The reason why the direction in which the camera 232 captures the screen image and the direction in which the prism 234 outputs the screen image are opposite is because when the user installs the beam projector unit 230 on the glasses 20, the camera 232 captures a front side that the user views and the screen image output from the projector 233 is viewed to the glass 22 of the user (please refer to FIG. 20).

The camera 232, the projector 233, and the prism 234 are fixed as a single module to the hinge 231. Thus, as the hinge 231 rotates, the direction in which the camera 232 captures an image and the direction in which the image output from the projector 233 is viewed are changed.

FIGS. 18A and 18B are conceptual views in which the camera 232 is oriented upwardly (direction 'a'). Here, a screen image output from the projector 233 is bent in a direction 'b' by the prism 234, the user cannot view the image output from the projector 233.

FIGS. 18C and 18D are views illustrating that the camera 232 is oriented to the front side. Here, the camera 232 captures an image in a direction 'c', and a screen image output from the projector 233 is in a direction 'd', and thus, the user may view the image output from the projector 233 on a arm portion.

FIG. 19 is a view illustrating a structure in which the modularized beam projector unit 230 is coupled with the band unit 210. A pogo pin terminal is formed in a lower end portion of the beam projector unit 230, and a coupling terminal 236*b* coupled to the pogo pin terminal may be provided to be recessed on an outer circumferential surface of the band unit 210.

Thus, the beam projector unit 230 is adjusted to the coupling terminal and force is slightly applied thereto to couple the beam projector unit 230 to the band unit 210.

Figure 21:
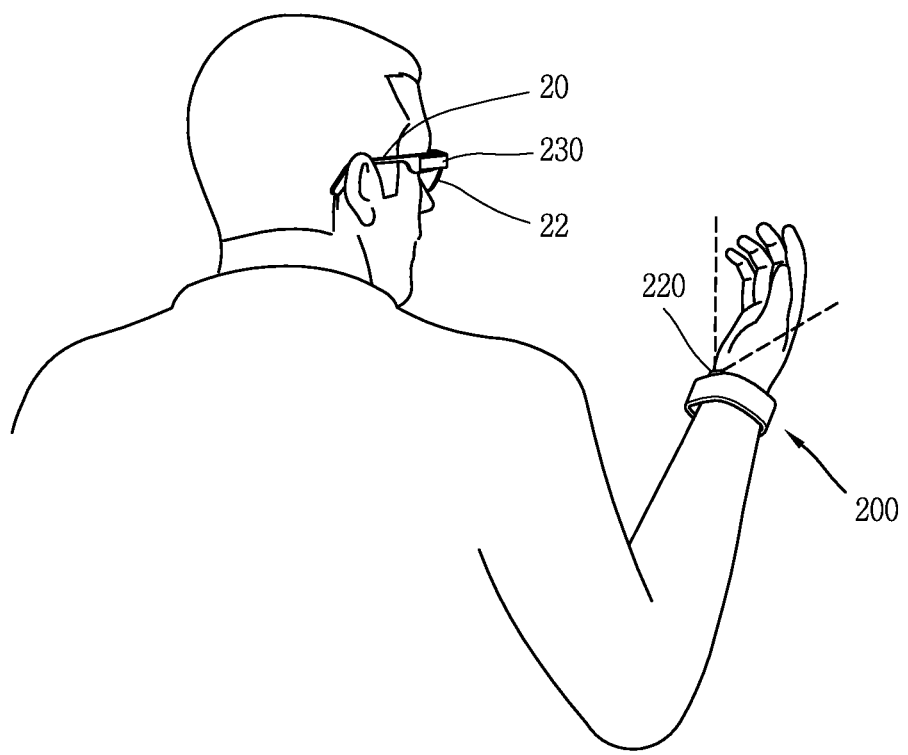
FIG. 21 is a conceptual view illustrating an example of using a control device in a state in which a user wears glasses illustrated in FIG. 20.

FIG. 20 is a perspective view illustrating a configuration in which the beam projector unit 230 module according to an exemplary embodiment of the present disclosure is coupled with the glasses 20, and FIG. 21 is a conceptual view illustrating an example of using a control device in a state in which a user wears the glasses 20 illustrated in FIG. 20.

Referring to FIG. 20, the beam projector 230 is installed in the glasses 20. The beam projector unit 230 may image the outside of the glasses 20 as described above and transmit screen information to the glasses 20 of the user through the projector 233.

Referring to FIG. 21, the user may install the beam projector unit 230 that may be separated from the watch type control device in the glasses 20. The user may view a screen on the glass 22 through the beam projector unit 230. The beam projector unit 230 and the watch type control device may be paired through an antenna.

Thus, the user may control a program displayed on the screen through the watch type control device, while viewing the screen through the glass 22.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A watch type control device comprising:
   a band configured to surround at least a portion of a user's wrist;
   an IR module disposed on a side of the band facing the user's hand when the watch type control device is worn on the user's wrist, the user's hand and wrist being on the same side of the user's body; and
   a beam projector disposed on the band and configured to outwardly project a screen, wherein the IR module is configured to recognize a user's hand gesture and to initiate the execution of a program causing the beam projector to output on the screen a display corresponding to the program, and wherein the band comprises:
- an outer band and an inner band coupled to the outer band,
- wherein the inner band is positioned between the outer band and the user's wrist when the watch type device is worn on the user's wrist,
- wherein the IR module is coupled to the band between the outer band and the inner band and movable along the side of the band between the outer band and the inner band,
- wherein a surface of the outer band facing the inner band comprises a first recessed rail extending parallel to the side of the band,
- wherein a surface of the inner band facing the outer band comprises a second recessed rail extending parallel to the side of the band, and
- wherein the IR module comprises a guide plate disposed, at least in part, between the outer and inner bands, the guide plate having a first portion projecting into the first recessed rail of the outer band and a second portion projecting into the second recessed rail of the inner band such that the first and second portions of the guide plate slide along and within the first and second recessed rails, respectively, when the IR module moves along the side of the band.

2. The watch type control device of claim 1 further comprising:
a first PCB disposed in the outer band and a second PCB disposed in the inner band, wherein the IR module further comprises a contact plate extending from the guide plate between the outer band and the inner band, the contact plate comprising a first terminal in contact with the first PCB and a second terminal in contact with the second PCB.

3. The watch type control device of claim 2, wherein the outer band comprises a first contact path extending parallel to the first recessed rail and the inner band comprises a second contact path extending parallel to the second recessed rail, the first contact path and the second contact path contacting the first PCB and the second PCB, respectively, and configured to keep the first terminal in contact with the first PCB and the second terminal in contact with the second PCB when the IR module unit moves along the side of the band.

4. The watch type control device of claim 2, wherein the first terminal and the second terminal are disposed on opposite sides of the contact plate.

5. The watch type control device of claim 1, wherein one of the first portion and the second portion projecting from the guide plate comprises a wobble preventing protrusion extending at an angle from the one first or second portion of the guide plate, and
wherein the first or second recessed rail, corresponding to the one first or second portion of the guide plate, comprises an additional recess configured to receive the wobble preventing protrusion, the wobble preventing protrusion and the additional recess configured such that the wobble preventing protrusion slides along and within the additional recess when the IR module moves along the side of the band.

6. The watch type control device of claim 1, wherein the beam projector is disposed on the outer band and is rotatable in three dimensions.

7. The watch type control device of claim 1, wherein the beam projector is detachably disposed on the outer band and configured to be functional when detached.

8. The watch type control device of claim 7, wherein the beam projector is configured to be attachable to user wearable glasses and to project the screen onto the glasses.

9. The watch type control device of claim 1 further comprising:
- a battery terminal disposed along a surface of the inner band facing the user's wrist, the battery terminal configured to receive a battery; and
- a connection pin coupled to and formed on a surface of the inner band facing the outer band.

10. The watch type control device of claim 1 further comprising:
an antenna.

11. The watch type control device of claim 10, wherein the antenna is at least one of a Wi-Fi antenna, a Bluetooth antenna, and a mobile communication antenna.

12. The watch type control device of claim 1 further comprising:
a speaker on the outer band, wherein the watch type control device is configured to generate sound through the speaker in conjunction with a display projected by the beam projector on the screen.

13. The watch type control device of claim 1 comprising:
a microphone unit on the outer band, wherein the watch type control device is configured to control a program, in response to voice instructions received through the microphone, that causes the beam projector to project a display corresponding to the program on the screen, and wherein the watch type device is further configured to record a sound received through the microphone.

14. The watch type control device of claim 13 further configured to record a sound in conjunction with the IR camera capturing an image.

15. The watch type control device of claim 1, wherein the IR module comprises:
- an IR laser configured to illuminate the user's hand with IR light; and
- an IR camera configured to capture an image of the user's hand based on IR light reflected from the user's hand, wherein the IR module recognizes a user's hand gesture based on the captured image of the user's hand.

16. The watch type control device of claim 15, wherein the IR camera and the IR laser are rotatable.

17. The watch type control device of claim 1 further comprising:
a control input configured to turn power to the watch type device on and off, and configured to select various control modes.

* * * * *